(12) United States Patent
Carson

(10) Patent No.: US 7,158,265 B1
(45) Date of Patent: Jan. 2, 2007

(54) METHOD OF CALIBRATING AN ENGRAVING MACHINE

(75) Inventor: Joyce B. Carson, Campobello, SC (US)

(73) Assignee: R.R. Donnelley & Sons Company, Chicago, IL (US)

( * ) Notice: Subject to any disclaimer, the term of this patent is extended or adjusted under 35 U.S.C. 154(b) by 577 days.

(21) Appl. No.: 09/712,093

(22) Filed: Nov. 14, 2000

(51) Int. Cl.
- B41C 1/02 (2006.01)
- G06F 19/00 (2006.01)
- G01B 11/22 (2006.01)

(52) U.S. Cl. ............... 358/3.29; 358/406; 700/173; 700/175; 700/193; 700/195; 356/627

(58) Field of Classification Search ............ 358/3.29, 358/3.31, 406, 504; 700/195, 193, 175, 174, 700/173; 356/627, 626, 628
See application file for complete search history.

(56) References Cited

U.S. PATENT DOCUMENTS 4,346,588 A * 8/1982 Tuttle .................. 73/105
5,293,426 A 3/1994 Wouch et al. ........... 358/3.29
5,422,958 A 6/1995 Wouch et al. ........... 358/3.29
5,818,605 A 10/1998 Crewe et al. ............ 358/406
5,948,293 A 9/1999 Somers et al. ......... 219/121.85

FOREIGN PATENT DOCUMENTS

DE  3614646 A1 * 11/1987

OTHER PUBLICATIONS

RollScope Surface Measurement System, Wyko Corporation Brochure, undated.

* cited by examiner

Primary Examiner—Scott A. Rogers
(74) Attorney, Agent, or Firm—Hanley, Flight and Zimmerman, LLC

(57) ABSTRACT

A method of calibrating a gravure engraving machine includes the steps of providing an engraving signal to the engraving machine to cause production of a cell, measuring the volume of the cell, comparing the measured cell value to a predetermined cell volume and adjusting the engraving cell in accordance with the comparison.

14 Claims, 3 Drawing Sheets

METHOD OF CALIBRATING AN ENGRAVING MACHINE

TECHNICAL FIELD

The present invention relates generally to a method of calibrating an engraving machine and more particularly to an engraver calibration method using a non-contact optical profiler.

BACKGROUND ART

Gravure printing is an intaglio process employing one or more engraved gravure printing cylinders. Image areas of each cylinder are engraved by an engraving head of an engraving machine to create cells. The cells vary in volume corresponding to the tonal values in the images.

The quality of the final printed product depends upon engraving the correct cell sizes on the cylinder. The shape and volume of each cell dictates how much ink that cell will hold and correspondingly, how an ink dot will appear in print. Even small variations in cell size can produce changes in dot size noticeable to the human eye. It has been shown in testing that the actual cell volume is more representative of the actual print density than the surface area of the cell. Therefore, it is necessary to calibrate the engraver so that accurate and repeatable cell volumes can be produced.

Past attempts to accurately calibrate an engraver have included the use of precision optical instruments to measure various spatial parameters of the cells in order to estimate actual cell volume. This technique is detailed in Wouch et. al. U.S. Pat. No. 5,293,426 assigned to the assignee of the present application. As detailed in such patent, an optical microscope is used to measure the length and width of the surface of a plurality of test cells. From such measurements, the depth, face area, and volume per unit area of each test cell may be estimated. Using statistical analysis, the average cell width, length, depth, face area, and volume per unit area are calculated. The average cell width, area, or volume per unit area is then compared with a predetermined standard value to compute any variance and to adjust the engraving head accordingly.

Non-contact optical profilers, such as the WYKO Rollscope, a vertical scanning interference microscope, have previously been used to characterize the surface roughness of such products as rubber, paper, ceramics, textured steel and aluminum, adhesives, films, and others. The WYKO Rollscope has also been used to characterize cells formed in anilox rolls used in flexographic reproduction. Each of these applications is characterized by relatively uniform depth, shape, volume and density of surface deformations.

SUMMARY OF THE INVENTION

According to one aspect of the present invention, a method of calibrating a gravure engraving machine which engraves images on a printed member such as a gravure printing cylinder includes the steps of providing an engraving signal of a predetermined waveshape to the engraving machine to cause the engraving machine to produce a gravure cell having a volume and measuring the value of the gravure cell using a non-contact optical profiler. The measured volume is compared with a predetermined cell volume to obtain a variance indication and the engraving machine is adjusted according to the variance indication.

BRIEF DESCRIPTION OF THE DRAWINGS

The features and advantages of the present invention will become more apparent from a detailed consideration of the invention taken in conjunction with the drawings in which.

DESCRIPTION OF THE PREFERRED EMBODIMENTS

Figure 1:
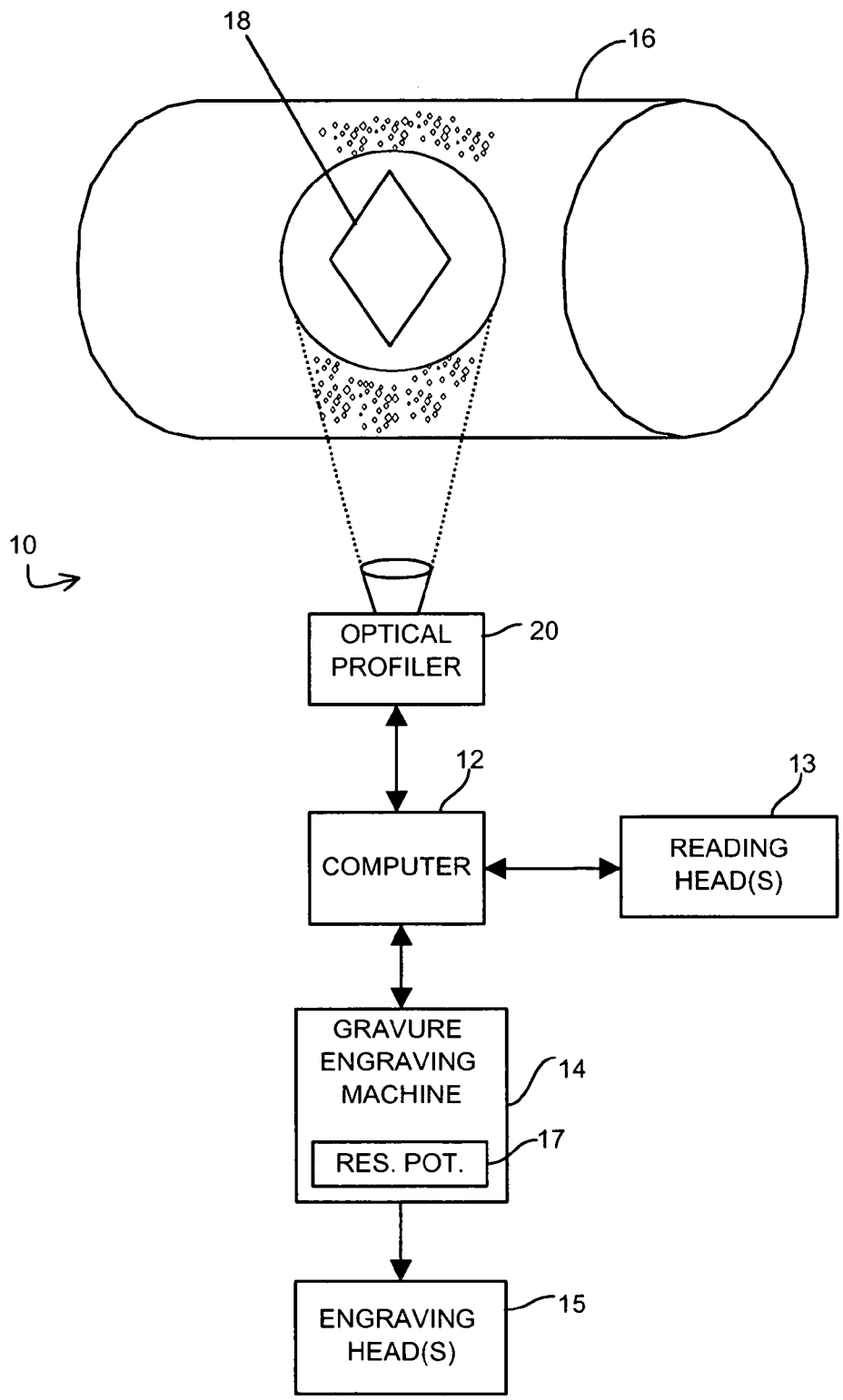
FIG. 1 is a block diagram of a printing cylinder engraver system utilizing the method of the present invention.

The present invention relates to electromechanical engraving of gravure printing cylinders, and more specifically, to a method of calibrating an engraving machine used to engrave gravure cylinders or other intaglio printing cylinders. Referring to FIG. 1, a gravure engraving system 10 includes a computer 12, which processes image densities or other optical parameters recorded by one or more reading heads 13 or stored in a data file, and an engraving machine 14, which receives electrical signals developed by the computer 12. The engraving machine 14 includes one or more engraving heads 15 having a diamond engraving stylus that engraves gravure cells in a copper cylinder in accordance with the electrical signals. The gravure cells are typically engraved at a speed of 3600 to 8000 cells per second. The engraving machine 14 further includes one or more resistance potentiometers 17 which control the penetration depth of the engraving heads 15, and thus the cell volume, by varying the electrical waveshape supplied to the engraving heads 15.

Prior to performing a production engraving process, the engraving system 10 must be calibrated. To accomplish this calibration, one or more test cells 18 are engraved in a cylinder using gravure engraving machine 14. A well-known gravure engraving machine 14 is a Helio-Klischograph engraving machine manufactured by Dr. Ing. Rudolf Hell GmbH.

As noted in greater detail hereinafter, the gravure engraving machine 14 is operated such that the diamond stylus cuts into the copper surface of the gravure printing cylinder 16 to form one or more test cells 18 in the general shape of an inverted pyramid. Although the test cell 18 is depicted as having an inverted diamond shape, those skilled in the art will appreciate that the shape of the test cell 18 will vary depending on a number of factors, including, for example, diamond stylus wear, gravure printing cylinder 16 rotation speed, and the electrical waveshape supplied to the engraving head(s) 15. The inverted pyramid shape, however, ensures consistent and excellent ink release even when printing on smooth and non-porous surfaces.

It is known that two gravure cells with the same spatial measurements of surface width and length, but cut with different diamond styli, can have different cell volumes. Testing has shown that the volume of a cell primarily dictates how the human eye perceives the optical density of the color printed by the cell. Even small variations in cell volume can produce large changes in the perceived color. Therefore, to effectively calibrate a gravure engraving machine 14, it is necessary to accurately correlate the actual volume of the test cells 18 produced by the machine 14 to the waveshape(s) used to produce the test cells 18.

One embodiment utilizes a non-contact optical profiler 20, such as the WYKO® RollScope (a vertical scanning interference microscope manufactured by Veeco Instruments, Inc., Plainview, N.Y.), to provide a fast, highly accurate measurement of gravure cell volume in order to permit calibration of an engraving machine.

Figure 2:
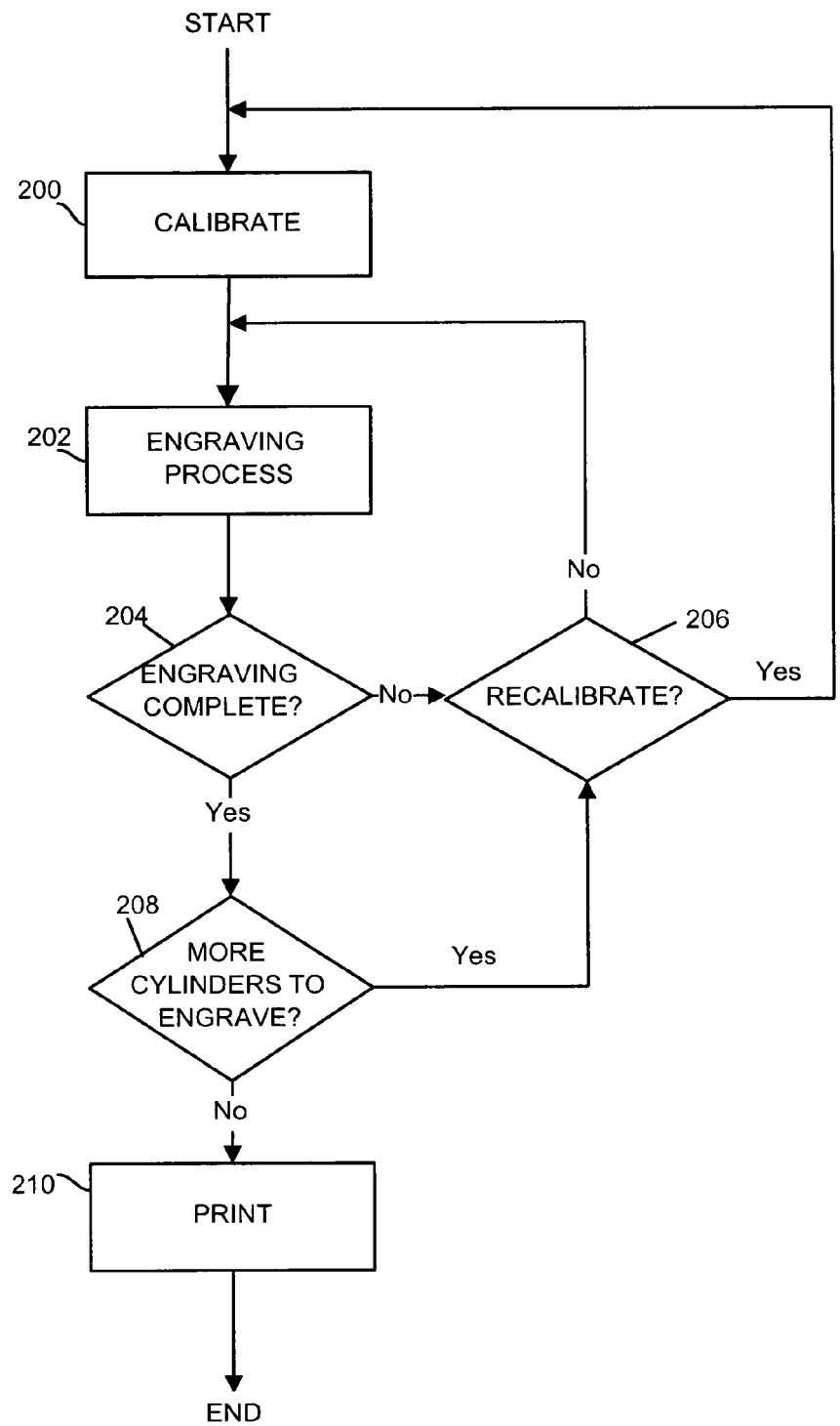
FIG. 2 is a flow chart of steps undertaken to produce printed copy.

A method of producing one or more gravure print cylinder(s) 16 for printing is set forth in the flow diagram illustrated in FIG. 2. Upon starting the production printing process, the gravure engraving machine 14 is calibrated at a step 200, described in greater detail in FIG. 3 below. After calibrating the gravure engraving machine 14, a gravure cylinder 16 is placed in the gravure engraving machine 14 and is engraved at a step 202. The engraving process 202 includes the steps of providing data representing a desired image to the computer 12, causing the computer 12 to convert the image to electrical waveforms of predetermined amplitude and pulse width, and transmitting the electrical waveforms to the gravure engraving machine 14. It should be noted that although the computer 12 is depicted as a single element in FIG. 1, it may, in practice, consist of multiple computers or central processing units which are interconnected together, for example, by a network. Also, a driver circuit which develops waveforms of appropriate magnitude and waveshape may be coupled between the computer 12 and the engraving machine 14.

Continuing with FIG. 2, once the engraving process 202 begins, a step 204 periodically determines whether the engraving process 202 is complete. If the engraving process 202 is not complete, a step 206 determines if recalibration of the gravure engraving machine 14 is necessary. The step 206 may use such factors as the last time the gravure engraving machine 14 was calibrated, the potential wear on the diamond engraving styli, the desired image quality, and other factors. If the step 206 determines that recalibration is not necessary, the engraving process 202 continues. If, however, the step 206 determines that recalibration is necessary, the calibration step 200 is reinitiated.

Returning to the step 204, if it is determined that the engraving process 202 is complete, a step 208 determines whether there are more cylinders to be engraved. If so, a new gravure cylinder 16 is loaded into the engraving machine and the process returns to the step 206. On the other hand, if there are no more cylinders to be engraved, the completed gravure cylinder(s) 16 are utilized at a step 210 to print copy.

Figure 3:
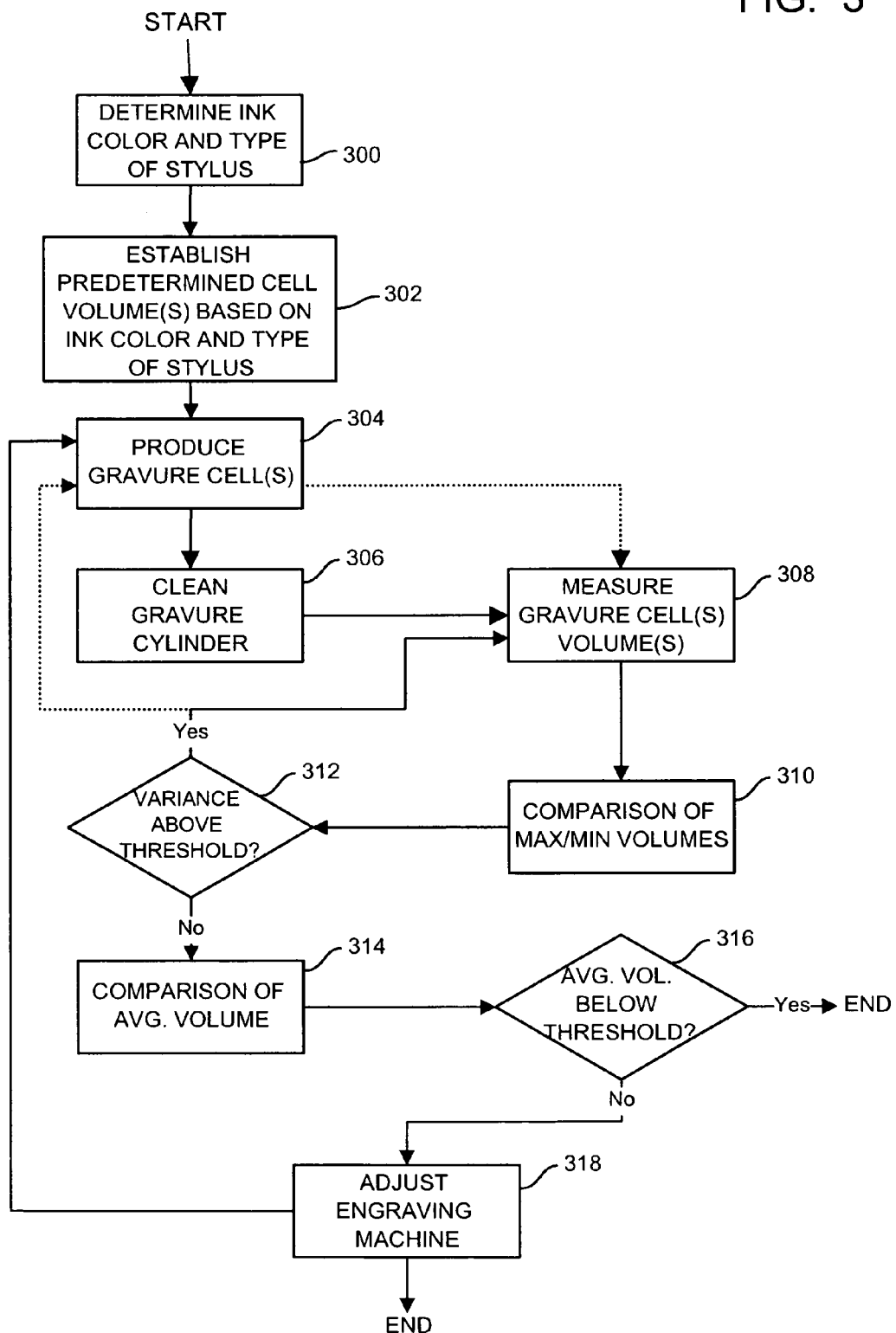
FIG. 3 is a flow chart of steps taken in accordance with the calibration step illustrated in FIG. 2 according to the present invention.

Turning to FIG. 3, there is shown in detail the method of calibration utilized by the step 200 according to the present embodiment. The process begins at a step 300 by determining the ink color the gravure cylinder 16 will print (for example, cyan, yellow, magenta, or black), and by determining the type of engraving stylus used by the gravure engraving machine 14 to engrave the gravure cylinder 16 (for example, a 140°, 130°, or 110° stylus). Following the step 300, at least one predetermined cell volume is established at a step 302 based upon the ink color and the stylus type determined at the step 300. It should be noted that the establishment of the predetermined cell volume need not be based on the variables of ink color and stylus type, but may be based on one or more other factors, including paper quality, paper roughness, batch variations in ink and papers, and stylus wear. Once the predetermined volume is established at the step 302, the gravure engraving machine 14 is operated at a step 304 to produce at least one gravure test cell associated with each predetermined cell volume. The step 304 is undertaken by causing the computer 12 to provide a waveform for each test cell having an amplitude and/or pulse width that nominally should produce a cell having the predetermined cell volume.

In the present embodiment, three linear rows of gravure test cells 18 are preferably (although not necessarily) produced as a test array in the gravure cylinder 16 at the step 304. Also preferably, each row includes approximately 70 test cells 18. The test cells 18 are produced with a cell volume which corresponds to a midtone tonal value (i.e., an optical density of approximately 0.48). It will be appreciated by those skilled in the art, however, that the tonal value chosen may range anywhere from a light highlight tone to a shadow tone, and may not be limited to a single tonal value.

After the production of the gravure test cells 18, the volumes of the gravure test cells are measured at a step 308. It has been determined, however, that a more accurate measurement at the step 308 may be obtained by optionally cleaning the gravure test cells 18 first, as noted at a step 306. In the preferred embodiment, the gravure test cells 18 are cleaned at the step 306 by the application of an antiperspirant sold under the trademark Degree® by Helene Curtis, Inc., of Chicago, Ill. (which includes the constituent aluminum sesquichlorohydrate). While it is not completely understood why the application of this cleaning agent has an effect upon the measurement of the gravure cell volume, two hypotheses have been considered. The first hypothesis is that the engraving process creates debris within the test cells 18 and the cleaning agent applied to the cells 18 washes away the debris. The second hypothesis is that the cleaning agent creates a more reflective surface that is more conducive to measurement.

After the gravure test cells 18 have been cleaned at the step 306, or directly following the engraving step 304, the gravure test cell volumes are measured at the step 308 by the optical profiler 20. The optical profiler 20 is capable of being equipped with various objective lenses which determine the number of test cells 18 measured at the step 308. For example, a 20 obj. lens will typically measure between three and five test cells, a 40 obj. lens two or three test cells, while a 50 obj. lens will typically measure one cell.

In the present embodiment, a test cell location is selected from the second or third rows of the three linear rows of test cells 18. Typically the fifth test cell from the leftmost test cell of the second or third row from the top of the test cell array is chosen. The optical profiler 20 is fitted with a 20 obj. lens and is adjusted to target a subset of the test cells including the chosen test cell. The optical profiler 20 displays a visual depiction of the targeted test cells 18 and is adjusted so that as many complete test cells 18 as possible are within the scanning region of the optical profiler 20. For example, the scanning region of a 20 obj. lens targeting the fifth test cell 18 in the second linear row may contain the fifth and sixth cells of both the second and third linear rows (i.e., four cells in a two by two pattern).

Regardless of the objective lens chosen, the optical profiler 20 scans the test cells 18 and calculates various measurements, each of which is a highly accurate, non-contact, three-dimensional volumetric measurement of each test cell 18. The optical profiler 20 provides measurements of the X, Y, and Z (length, width and depth) spatial dimensions, as well as the volume of each test cells 18. The optical profiler 20 also provides a statistical average of each measurement (i.e., length, width, depth, and volume) over the multiple cells, as well as maximum and minimum values for each dimensional measurement for all of the cells taken as a group.

Once the measurements are obtained, the maximum and minimum volumetric measurements for the target cells are first analyzed for a variance at a step 310. A step 312 then determines whether the variance between the maximum and minimum volumes of the test cells is greater than a desired threshold, for example 2 µm³. If the variance is greater than the desired threshold, the measurement step 308 is repeated, using either with the same target cells or other target cells in the existing test cell array. Alternatively, after an appropriate number of failed attempts (for example, three) at obtaining a suitable volumetric variance, the step 304 may be repeated to obtain a new test cell array, which is thereafter analyzed at the steps 308, 310 and 312 as noted above.

It will be further appreciated by those skilled in the art that if the optical profiler 20 is fitted with an objective lens that measures only one test cell 18, the steps 310 and 312 will not be necessary and can be omitted.

Once an acceptable maximum and minimum volumetric variance is obtained, a comparison is performed at a step 314 between the measured average test cell volume determined at the step 308 and the predetermined cell volume from the step 302. A step 316 then determines if the variance between the average volume of the test cells 18 and the predetermined volume is less than a desired threshold value (i.e., the step 316 determines whether the variance is within acceptable limits), for example 1 µm³. If the step 316 determines the gravure engraving machine 14 is calibrated within acceptable limits, the calibration step 200 is terminated, otherwise, the gravure engraving machine 14 may be adjusted at a step 318.

To adjust the gravure engraving machine 14, the resistance potentiometer(s) 17 is (are) manipulated to change the electrical waveshape supplied to the engraving head(s) 15 in accordance with the average volume variance calculated at the step 314. Upon completion of the step 318, the calibration may preferably return to the step 304 to produce new gravure test cells 18 for calibration verification, or alternatively, the calibration step 200 may end.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of calibrating a gravure engraving machine, the method comprising the steps of:
    providing an engraving signal of a predetermined waveshape to the engraving machine to cause the engraving machine to produce a gravure cell having a volume;
    measuring the volume of the gravure cell using a non-contact optical profiler;
    comparing the measured volume of the gravure cell to a predetermined cell volume to obtain a variance indication;
    selecting the predetermined cell volume in dependence upon a particular factor; and
    adjusting the engraving machine in accordance with the variance indication.

2. The method of claim 1, wherein the step of adjusting the engraving machine further comprises the step of tuning a resistance potentiometer to vary the predetermined waveshape.

3. The method of claim 1, wherein the calibration is undertaken at a number of times during an engraving procedure.

4. The method of claim 1, wherein the non-contact optical profiler is an optical vertical scanning interferometer microscope.

5. The method of claim 1, wherein the particular factor is at least one of an ink color, a stylus type, a paper quality, a paper roughness, or a stylus condition.

6. The method of claim 1, wherein the gravure engraving machine engraves a cylinder for a particular factor and wherein the step of comparing the measured volume of the gravure cell further comprises the step of selecting the predetermined cell volume in dependence upon the particular factor.

7. The method of claim 6, wherein the particular factor is at least one of an ink color, a stylus type, a paper quality, a paper roughness, or a stylus condition.

8. A method of calibrating a gravure engraving machine, the method comprising the steps of:
    providing an engraving signal of a predetermined waveshape to the engraving machine to cause the engraving machine to produce a gravure cell having a volume;
    cleaning the gravure cell;
    measuring the volume of the gravure cell using a non-contact optical profiler;
    comparing the measured volume of the gravure cell to a predetermined cell volume to produce a comparison variance;
    selecting the predetermined cell volume in dependence upon a particular factor, the particular factor being at least one of an ink color, a stylus type, a paper quality, a paper roughness, or a stylus condition; and
    adjusting the engraving machine in accordance with the comparison variance.

9. The method of claim 8, wherein the step of cleaning the gravure cell includes the application of aluminum sesquichlorohydrate to the surface of the gravure cell.

10. The method of claim 8, wherein the step of adjusting the engraving machine further comprises the step of tuning a resistance potentiometer to vary the predetermined waveshape.

11. The method of claim 8, wherein the calibration is undertaken at a number of times during an engraving procedure.

12. The method of claim 8, wherein the non-contact optical profiler is an optical vertical scanning interferometer microscope.

13. A method of calibrating a gravure engraving machine, the method comprising the steps of:
    (a) providing a number of engraving signals each of a predetermined waveshape to the engraving machine to cause the engraving machine to produce at least a plurality of gravure cells each having a volume;
    (b) measuring the volume of each of the plurality of gravure cells using a non-contact optical profiler to obtain a maximum volume, a minimum volume, and an average volume for the plurality of gravure cells;
    (c) comparing the measured maximum and minimum volumes of the gravure cells to obtain a volume variance;
    (d) repeating steps (b) and (c) if the volume variance is greater than a first threshold value;
    (e) comparing the measured average volume for the plurality of gravure cells to a predetermined cell volume to obtain an average volume variance if the volume variance is less than the first threshold value; and (f) adjusting the engraving machine in accordance with the average volume variance if the average volume variance is below a second threshold.

14. The method of claim 13, wherein step (d) is undertaken a maximum of three times, and including the further step of repeating step (a), if the volume variance is greater than the first threshold value after the third time that the step (d) has be undertaken, to produce a further plurality of gravure cells and repeating steps (b) through (f) upon the new plurality of gravure cells.

* * * * *